United States Patent Office.

AISIK KREIDMANN, OF ALTONA, GERMANY.

METHOD OF MAKING A SOLUBLE PREPARATION OF QUININ AND CAFFEIN.

SPECIFICATION forming part of Letters Patent No. 625,886, dated May 30, 1899.

Application filed January 17, 1899. Serial No. 702,396. (No specimens.)

*To all whom it may concern:*

Be it known that I, AISIK KREIDMANN, a subject of the King of Roumania, residing at Altona, in the Kingdom of Prussia and Empire of Germany, have invented certain new and useful Improvements in a new and useful Process for the Manufacture of a Readily-Soluble Preparation Containing Caffein and Quinin, of which the following is a full, clear, and exact description.

The present invention relates to a process for the manufacture of a readily-soluble preparation containing caffein and quinin.

Experiments made during many years on sick people have shown that caffein and quinin when combined in definite proportions, by weight, with narcotic alkaloids (atropin, strychnin, &c.) and administered by subcutaneous injection have specific anti-toxic actions against the most severe and acute infectious diseases, such as diphtheria, scarlet-fever, whooping-cough, pneumonia, &c.; but the solutions must be very highly concentrated and, except water, no other addition must be made to the same. Only quinin chlorid and the neutral caffein are suitable for the production of a solution of this kind. First, upon two parts, by weight, of hydro-chlorate of quinin (quinin chlorid) and one part, by weight, of neutral caffein are poured three parts of warm distilled water, and the said quinin chlorid and caffein are dissolved by shaking and gently heating. The yellowish solution is allowed to crystallize in open vessels at the ordinary temperature of the room. The white dry crystals are then again mixed with half their weight of a mixture of two parts of quinin chlorid and one part of caffein. They are then dissolved, as above described, and again crystallized. This procedure is repeated for the third time. Second, two parts of hydro-chlorate of quinin are dissolved with one part of neutral caffein in six parts of warm distilled water. At a temperature of 60° centigrade the water is evaporated to one-half, and the remainder is left in open vessels at the ordinary temperature of the room until it has been completely crystallized and is dried up. The salt thus obtained can be dissolved without any addition at 60° centigrade with shaking in one-half of its weight of water, and it does not crystallize out again even when frozen. It is permanent, not hygroscopic, and gives a yellowish solution; but it is converted by acids, alkalies, and carbol and also by boiling for a long time into a substance which is insoluble in water. Only by shaking the acid solution with ether can the caffein be completely separated again from the quinin, and the crystals are not isomorphous either with those of quinin or with those of caffein. The salt contained therein stands alone in the pharmacopœia in a pharmaceutical dynamic respect. With atropin it acquires the action of digitalin and morphia. When mixed with traces of arsenic and injected subcutaneously and rubbed into the skin, it is the best agent against malaria. It has been successfully employed against yellow fever. In this respect it has about three times as strong an action as quinin and twice as strong an action as caffein employed alone. The most effective doses are per dose 0.4 and per day 1.0 gram for adults.

For administration for rubbing the following solution may be employed: of the double salt produced as above described, 4.5 grams; chloroform, 25.0 grams; absolute alcohol, 7.5 grams; pure olive-oil, 40.0 grams.

In making this medicine for administration it is to be noted that the quinin-caffein double salt to be employed must first be dissolved in chloroform.

What I claim, and desire to secure by Letters Patent, is—

1. The process for the manufacture of a preparation containing caffein and quinin and readily soluble in water consisting in dissolving two parts by weight quinin chlorid and one part by weight of caffein in warm distilled water allowing the solution to crystallize in open vessels at the ordinary temperature of the room, then mixing the dried crystals with half their weight of two parts of quinin chlorid and one part of caffein, then again dissolving and crystallizing out, substantially as described.

2. The process for the manufacture of a preparation containing caffein and quinin and readily soluble in water, consisting in forming a solution in warm water of two parts by weight of quinin chlorid with one part by weight of neutral caffein, and allowing the solution to crystallize out at the ordinary temperature of the room, substantially as described.

In witness whereof I subscribe my signature in presence of two witnesses.

AISIK KREIDMANN.

Witnesses:
E. H. L. MUMMANHOFF,
OTTO W. HELLENRICH.